(12) United States Patent
Su et al.

(10) Patent No.: US 10,391,984 B2
(45) Date of Patent: Aug. 27, 2019

(54) WHEEL SPEED SENSOR DRIVING MECHANISM

(71) Applicants: Kuo-Hsin Su, New Taipei (TW); Ta-Yu Su, New Taipei (TW)

(72) Inventors: Kuo-Hsin Su, New Taipei (TW); Ta-Yu Su, New Taipei (TW)

( * ) Notice: Subject to any disclaimer, the term of this patent is extended or adjusted under 35 U.S.C. 154(b) by 373 days.

(21) Appl. No.: 15/283,566

(22) Filed: Oct. 3, 2016

(65) Prior Publication Data

US 2018/0095102 A1    Apr. 5, 2018

(51) Int. Cl.
| | |
|---|---|
| *G01P 3/487* | (2006.01) |
| *B60T 8/171* | (2006.01) |
| *B60T 8/17* | (2006.01) |
| *B60T 8/176* | (2006.01) |

(52) U.S. Cl.
CPC ............ *B60T 8/171* (2013.01); *B60T 8/1706* (2013.01); *G01P 3/487* (2013.01); *B60T 8/176* (2013.01); *B60T 2240/00* (2013.01)

(58) Field of Classification Search
CPC .......................... G01P 3/487; G01M 17/013; G01M 17/0076
USPC .................................................. 324/173, 174
See application file for complete search history.

(56) References Cited

U.S. PATENT DOCUMENTS

| | | | | |
|---|---|---|---|---|
| 3,719,887 A | * | 3/1973 | Shimizu ................... | G01P 3/487 324/171 |
| 4,966,380 A | * | 10/1990 | Mercat ..................... | B62M 1/00 280/259 |
| 5,465,819 A | * | 11/1995 | Weilant .................. | B60K 17/20 192/35 |
| 2010/0271008 A1 | * | 10/2010 | Su ........................... | G01P 1/026 324/173 |

* cited by examiner

*Primary Examiner* — Lisa M Caputo
*Assistant Examiner* — Alex T Devito
(74) *Attorney, Agent, or Firm* — Rosenberg, Klein & Lee

(57) ABSTRACT

A wheel speed sensor driving mechanism includes a motorcycle front wheel hub axle tube having chamfered driving blocks equiangularly spaced around an inner perimeter thereof, a follower unit concentrically mounted in the motorcycle front wheel hub axle tube and having chamfered ribs equiangularly arranged around the periphery of one end of the worm wheel and a mounting groove defined between each two adjacent ribs for receiving the chamfered driving blocks. Further, the number of the ribs of the follower unit is divisible by the number of the driving blocks of the motorcycle front wheel hub axle tube.

4 Claims, 5 Drawing Sheets

WHEEL SPEED SENSOR DRIVING MECHANISM

BACKGROUND OF THE INVENTION

1. Field of the Invention

The present invention relates to motorcycle technology and more particularly, to a wheel speed sensor driving mechanism for motorcycle, which facilitates mounting and dismounting, reduces friction between the center hole of the follower unit and the central axle tube of the meter gear housing, and assures accurate component positioning and synchronous concentric rotation of the follower unit with the axle tube of the motorcycle front wheel hub to enhance accurate signal detection.

2. Description of the Related Art

FIG. 4 illustrates a wheel speed sensor driving mechanism for motorcycle according to the prior art. According to this design, the wheel speed sensor driving mechanism comprise a front wheel hub 4' axle tube 41' having two protruding lugs 42' at a front end thereof and two opposing recessed gaps 421' defined between the two opposing protruding lugs 42' at two opposite sides, a meter gear housing 5' with a central axle tube 51' fastened to the front fork of the motorcycle with a lock screw 56' and prohibited from rotation with the front wheel hub 4', a follower unit 52' mounted around the central axle tube 51' inside the meter gear housing 5' and secured thereto in place with a C-shaped retainer 53' and comprising a worm wheel 521', a driving ring 522' at one side of the worm wheel 521' and two blocks 523' located on the periphery of the driving ring 522' at two opposite sides and respectively received in the respective recessed gaps 421' and drivable to rotate by the protruding lug 42' of the axle tube 41' of the front wheel hub 4', a wheel speed sensing unit 54' mounted in the meter gear housing 5' and comprising a worm 541' meshed with the worm wheel 521' of the follower unit 52' and a magnetic domain element 542' connected to the worm 541' for synchronous rotation, and a sensing element 55' mounted in the meter gear housing 5' for detecting changes in a magnetic domain around the magnetic domain element 542' upon rotation of the magnetic domain element 542' with the worm 541' and outputting the detected data through a signal line 551' to an electronic speedometer/tachometer for indicating the speed and distance.

FIG. 5 illustrates another prior design of wheel speed sensor driving mechanism. According to this design, a magnetic domain element 57' is mounted on a tubular shaft 524' around the central axle tube 51" of the housing 5" and disposed at one side of the driving ring 522' to substitute for the worm wheel 521' shown in FIG. 4, thus, the sensing element 55' in the housing 5" detects changes in the magnetic domains around the magnetic domain element 57' and outputs the detected data through a signal line 551' to an electronic speedometer/tachometer or a computer of a ABS (anti-lock brake system) control unit for indicating the speed and distance.

The aforesaid two prior art wheel speed sensor driving mechanism designs are still not satisfactory in function and have drawbacks as follows:

1. Interferences can be produced to cause an operational abnormality or failure:

Because the follower unit 52' is mounted inside the meter gear housing 5', the worker cannot visually check whether or not the blocks 523' at the driving ring 522' have been accurately positioned in the respective recessed gap 421' of the axle tube 41' during the installation in the assembly line or maintenance factory. If the blocks 523' at the driving ring 522' are not accurately positioned in the respective recessed gaps 421' of the axle tube 41', interferences between the axle tube 41' and the follower unit 52' will be produced. When fastening up the lock screw 56' at this time, the blocks 523' at the driving ring 522' will be driven to break by the protruding lugs 42', leading to unsmooth rotation of the wheel and causing the follower unit 52' unable to rotate the wheel speed sensing unit 54'.

2. The ABS (anti-lock brake system) or electronic tachometer signal reading error can occur, resulting in ABS (anti-lock brake system) operation error or electronic tachometer abnormal indication:

In the aforesaid prior art designs, the worker cannot visually check whether or not the blocks 523' at the driving ring 522' have been accurately positioned in the respective recessed gap 421' of the axle tube 41' during the installation in the assembly line or maintenance factory. In order to enabling the blocks 523' to be accurately positioned in the respective recessed gaps 421' of the axle tube 41' during the installation, the recessed gaps 421' must be made relatively larger. Making the recessed gaps 421' relatively larger enabling the worker to accurately insert the blocks 523' into the respective recessed gaps 421' by feeling and experience.

The aforesaid prior art designs are suitable for use in mechanical meters without causing much trouble. However, these prior art designs are not practical for use with an advanced electronic tachometer or computer-based ABS (anti-lock brake system) control unit. The large recessed gaps 421' for receiving the blocks 523' at the driving ring 522' can cause signal error or delay, leading to an erroneous tachometer indication or ABS (anti-lock brake system) false activation. Further, due to friction between the center hole of the driving ring 522' and the central axle tube 51" of the housing 5", the radial gap will become larger after long uses, and the error will be more obvious, leading to an ABS (anti-lock brake system) brake signal error.

SUMMARY OF THE INVENTION

The present invention has been accomplished under the circumstances in view. It is one object of the present invention to provide a wheel speed sensor driving mechanism for motorcycle, which facilitates mounting and dismounting, reduces friction between the center hole of the follower unit and the central axle tube of the meter gear housing, and assures accurate component positioning and synchronous concentric rotation of the follower unit with the axle tube of the motorcycle front wheel hub to enhance accurate signal detection.

To achieve this and other objects of the present invention, a wheel speed sensor driving mechanism comprises a motorcycle front wheel hub axle tube, a follower unit, a meter gear housing having a central axle tube, and a wheel speed sensing unit. The follower unit is concentrically mounted on the central axle tube of the meter gear housing, comprising a worm wheel, a plurality of ribs equiangularly arranged around the periphery of one end of the worm wheel and a mounting groove defined between each two adjacent ribs. Further, each rib has a chamfered edge at each of axial and radial ends thereof. The motorcycle front wheel hub axle tube comprises a plurality of driving blocks equiangularly spaced around an inner perimeter thereof and engaged into respective mounting grooves of the follower unit. Further, the motorcycle front wheel hub axle tube has a chamfered edge at a distal end thereof. Further, each driving block has a chamfered edge at a distal end thereof. Further, the number of the ribs of the follower unit is divisible by the number of the driving blocks of the motorcycle front wheel hub axle tube. Thus, the chamfered edges of the motorcycle front wheel hub axle tube and the driving blocks are configured to mate with the chamfered edges of the ribs of the follower unit for guiding the driving blocks of the driving member into the respective mounting grooves of the follower unit smoothly.

In one embodiment, the speed sensing unit comprises a worm mounted in the meter gear housing and meshed with and rotatable by the worm wheel, a magnetic domain element fixedly connected to the worm for synchronous rotation, and a sensing element mounted in the meter gear housing and adapted for detecting changes in a magnetic domain around the magnetic domain element upon rotation of the magnetic domain element with the worm and outputting the detected data through a signal line to an electronic speedometer/tachometer for indicating the speed and distance.

In another embodiment of the present invention, the follower unit comprises a magnetic domain sensing unit; the wheel speed sensing unit comprises a sensing element mounted in the housing and adapted for detecting changes in magnetic domains around the magnetic domain element upon rotation of the magnetic domain element with the follower unit and the driving member, and then outputting the detected data through a signal line to a computer of an ABS (anti-lock brake system) control unit for indicating the speed and distance.

Other advantages and features of the present invention will be fully understood by reference to the following specification in junction with the accompanying drawings, in which like reference signs denote like components of structure.

DETAILED DESCRIPTION OF THE PREFERRED EMBODIMENT

Figure 1:
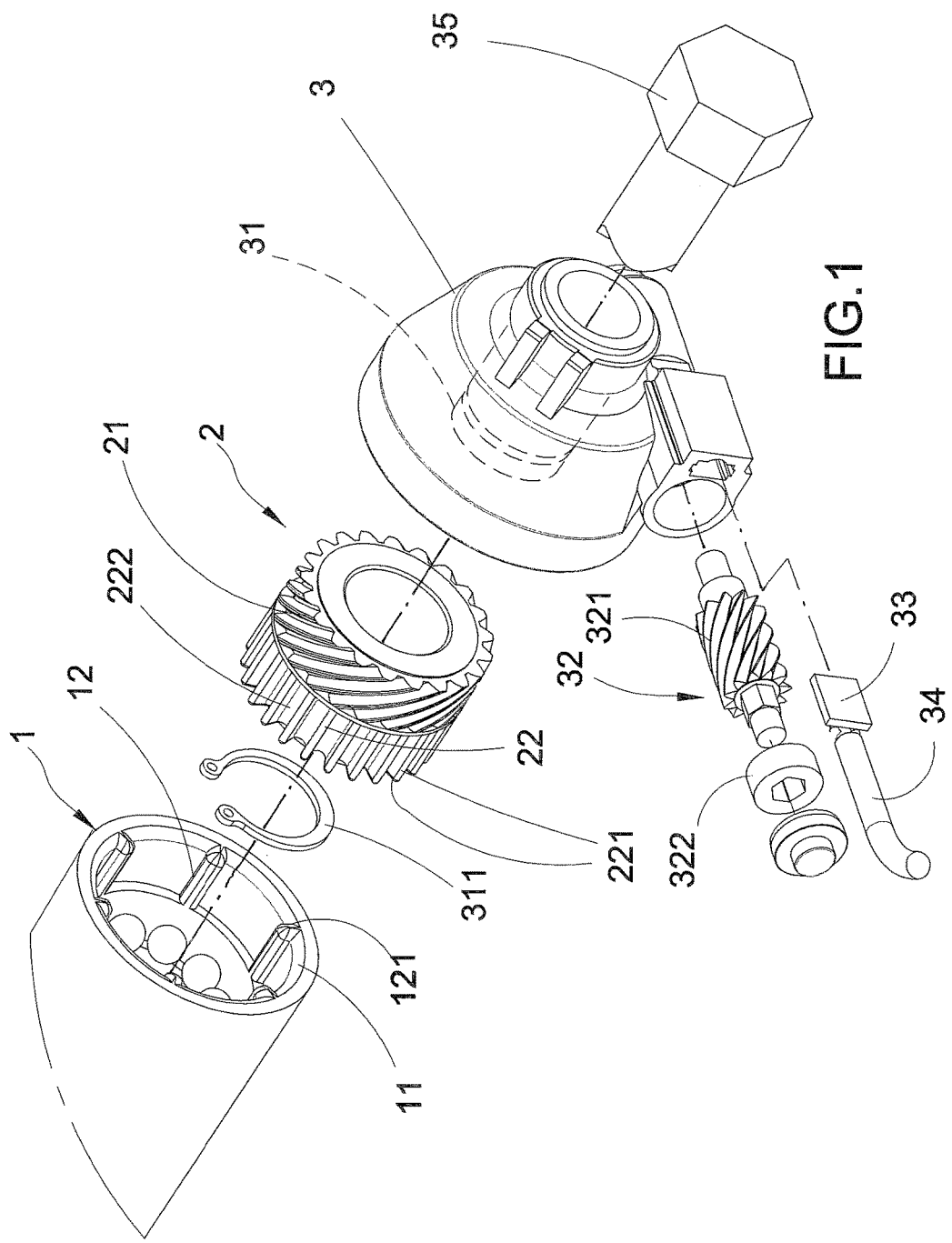
FIG. 1 is an exploded view of a wheel speed sensor driving mechanism in accordance with a first embodiment of the present invention.

Referring to FIG. 1, a wheel speed sensor driving mechanism in accordance with a first embodiment of the present invention is shown. The wheel speed sensor driving mechanism comprises a motorcycle front wheel hub axle tube 1, a follower unit 2, a meter gear housing 3 and a wheel speed sensing unit 32. The follower unit 2 is mounted on a central axle tube 31 of the meter gear housing 3, and secured thereto with a C-shaped retainer 311. The follower unit 2 comprises a gear means, for example, worm wheel 21, a plurality of ribs 22 equiangularly arranged around the periphery of one end of the worm wheel 21, and a mounting groove 222 defined between each two adjacent ribs 22. Each rib 22 of the follower unit 2 has a chamfered edge 221 at each of axial and radial ends thereof. The motorcycle front wheel hub axle tube 1 comprises a plurality of driving blocks 12 equiangularly spaced around an inner perimeter thereof. The number of the ribs 22 of the follower unit 2 is divisible by the number of the driving blocks 12. The motorcycle front wheel hub axle tube 1 has a chamfered edge 11 at a distal end thereof. Each driving block 12 has a chamfered edge 121 at a distal end thereof. Further, a lock screw 35 is inserted through the central axle tube 31 of the meter gear housing 3 and threaded into the motorcycle front wheel hub axle tube 1 to lock the meter gear housing 3 in position. Further, the design of the chamfered edges 121 of the driving blocks 12 of the motorcycle front wheel hub axle tube 1 and the chamfered edges 221 of the ribs 22 enables the driving blocks 12 of the motorcycle front wheel hub axle tube 1 to be rapidly and accurately engaged into respective mounting grooves 222 of the follower unit 2, facilitating quick installation and assuring accurate concentric positioning of the follower unit 2 in the motorcycle front wheel hub axle tube 1.

When the motorcycle is running, the motorcycle front wheel hub axle tube 1 is rotated with the front wheel of the motorcycle, causing synchronous rotation of the ribs 22 and worm wheel 21 of the follower unit 2. During rotation of the worm wheel 21, a worm 321 and a magnetic domain element 322 of the wheel speed sensing unit 32 are driven by the worm wheel 21 to rotate in the meter gear housing 3 relative to a sensing element 33, causing the sensing element 33 to detect changes in the magnetic domain around the magnetic domain element 322 and to output the detected data through a signal line 34 to an electronic speedometer/tachometer for indicating the speed and distance.

Figure 2:
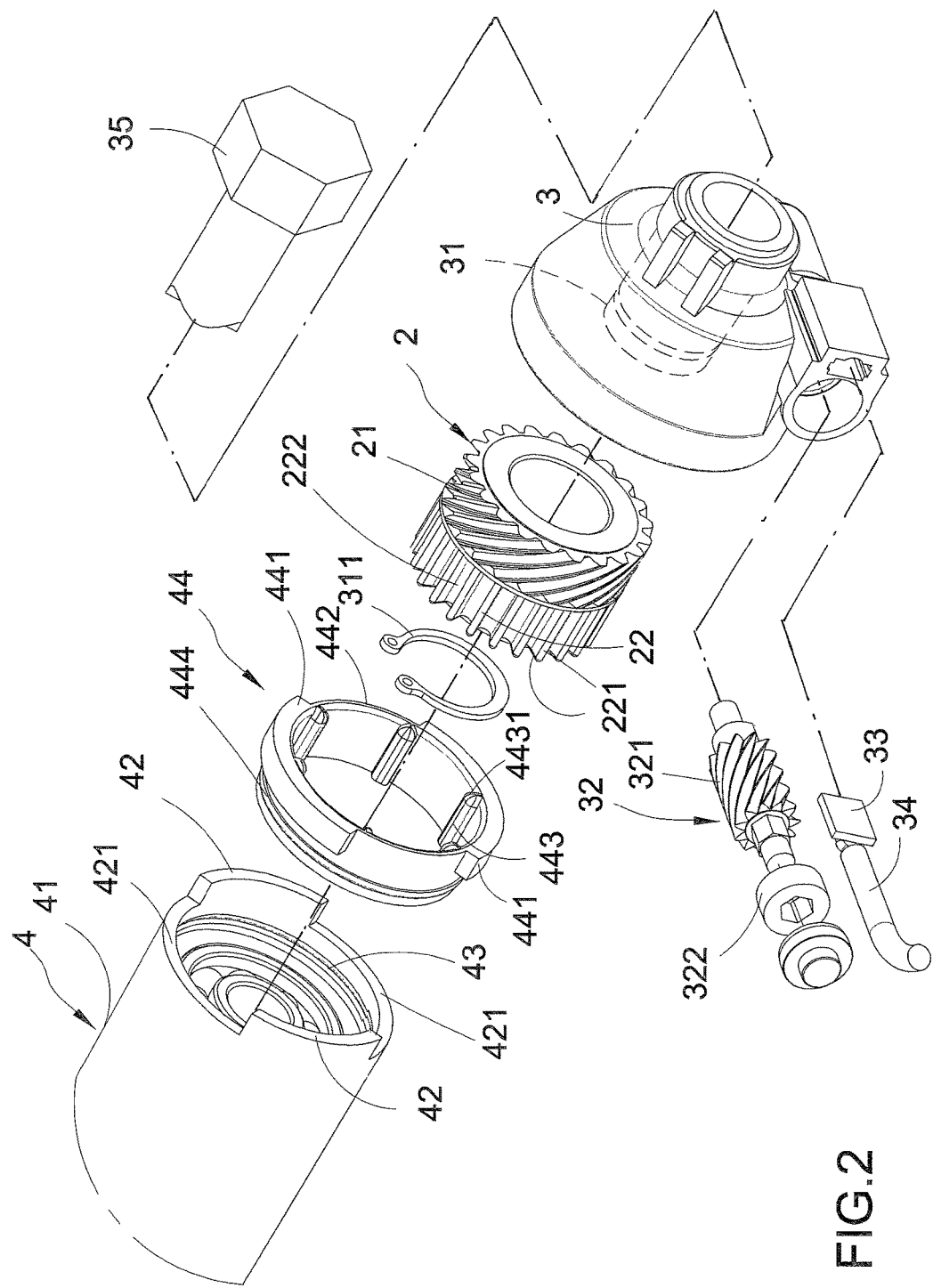
FIG. 2 is an exploded view of a wheel speed sensor driving mechanism in accordance with a second embodiment of the present invention.

Referring to FIG. 2, a wheel speed sensor driving mechanism in accordance with a second embodiment of the present invention is shown. As illustrated, the wheel speed sensor driving mechanism comprises an axle tube 41 of a conventional motorcycle front wheel hub 4, a driving member 44, a follower unit 2, a meter gear housing 3 and a wheel speed sensing unit 32. The follower unit 2 is mounted on a central axle tube 31 of the meter gear housing 3, and secured thereto with a C-shaped retainer 311. The follower unit 2 comprises a worm wheel 21, a plurality of ribs 22 equiangularly arranged around the periphery of one end of the worm wheel 21, and a mounting groove 222 defined between each two adjacent ribs 22. Each rib 22 of the follower unit 2 has a chamfered edge 221 at each of axial and radial ends thereof. The driving member 44 is mounted in a distal end of the axle tube 41 of the front wheel hub 4, comprising a chambered edge 442 at one end thereof, a plurality of driving blocks 443 equiangularly spaced around an inner perimeter thereof. The number of the ribs 22 of the follower unit 2 is divisible by the number of the driving blocks 443. Each driving block 443 has a chamfered edge 4431 at a distal end thereof. The axle tube 41 of the front wheel hub 4 comprises two opposing protruding lugs 42 axially forwardly extended from the distal end thereof, two opposing recessed gaps 421 defined between the two opposing protruding lugs 42 at two opposite sides, and an annular locating groove 43 defined in the inner perimeter thereof. The driving member 44 further comprises two arched driving blocks 441 extended around the outer perimeter thereof and respectively inserted into the two opposing recessed gaps 421 of the axle tube 41 of the front wheel hub 4, and a retaining flange 444 extended around the outer perimeter at one side relative to the arched driving blocks 441 and engaged into the annular locating groove 43 of the axle tube 41 of the front wheel hub 4. Further, a lock screw 35 is inserted through the central axle tube 31 of the meter gear housing 3 and threaded into the axle tube 41 of the front wheel hub 4 to lock the meter gear housing 3 in position.

Further, the design of the chamfered edge 442 of the driving member 44, the chamfered edges 4431 of the driving blocks 443 and the chamfered edges 221 of the ribs 22 enables the driving blocks 443 of the driving member 44 to be rapidly and accurately engaged into respective mounting grooves 222 of the follower unit 2, facilitating quick installation and assuring accurate concentric positioning of the follower unit 2 in the driving member 44.

When the motorcycle is running, the axle tube 41 of the front wheel hub 4 is rotated with the front wheel of the motorcycle, causing the driving member 44 to rotate the follower unit 2. At this time, the worm wheel 21 drive the worm 321 and magnetic domain element 322 of the wheel speed sensing unit 32 to rotate relative to the sensing element 33, causing the sensing element 33 to detect changes in the magnetic domain around the magnetic domain element 322 and to output the detected data through a signal line 34 to an electronic speedometer/tachometer for indicating the speed and distance.

Figure 3:
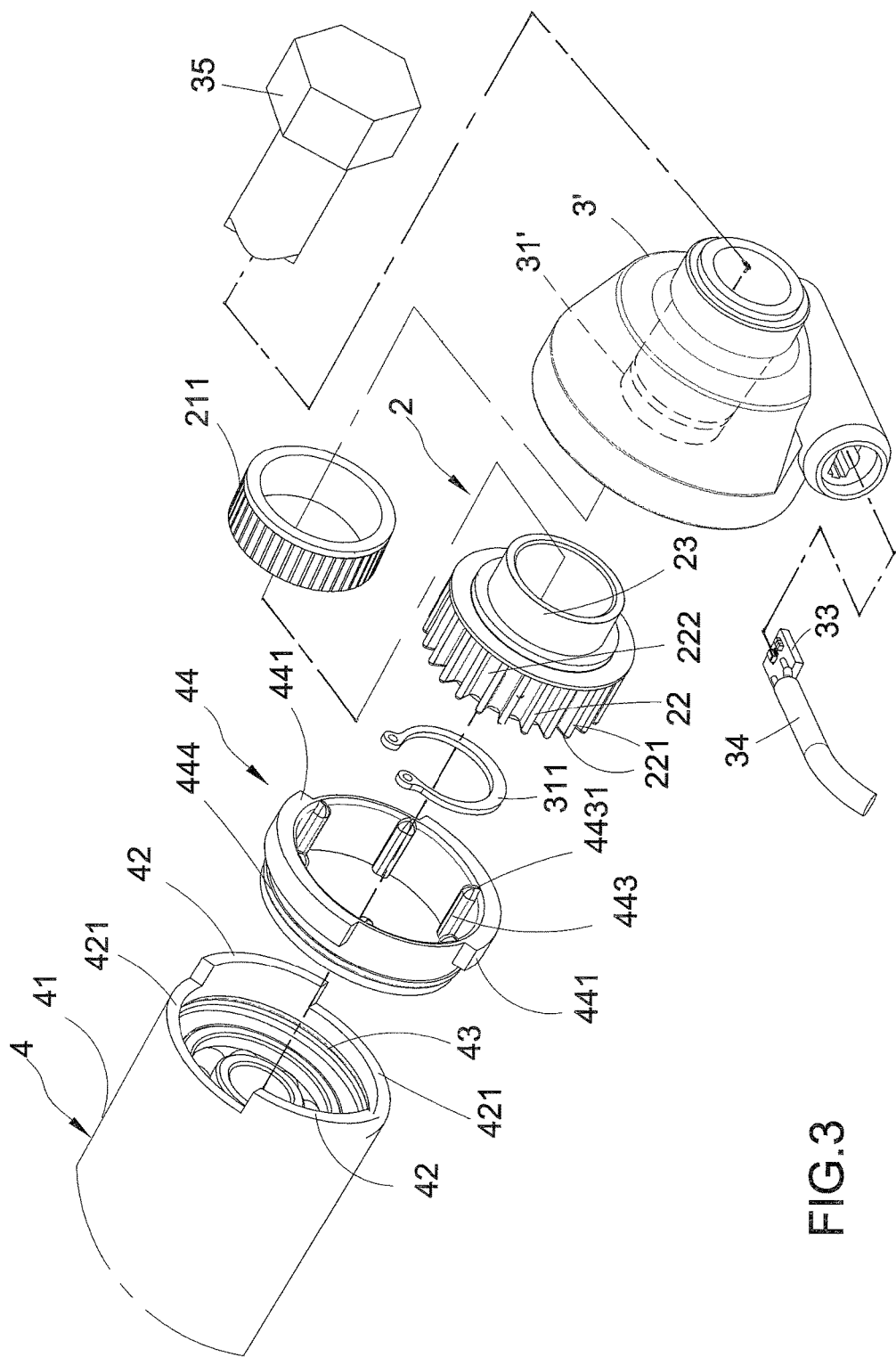
FIG. 3 is an exploded view of a wheel speed sensor driving mechanism in accordance with a third embodiment of the present invention.
Figure 4:
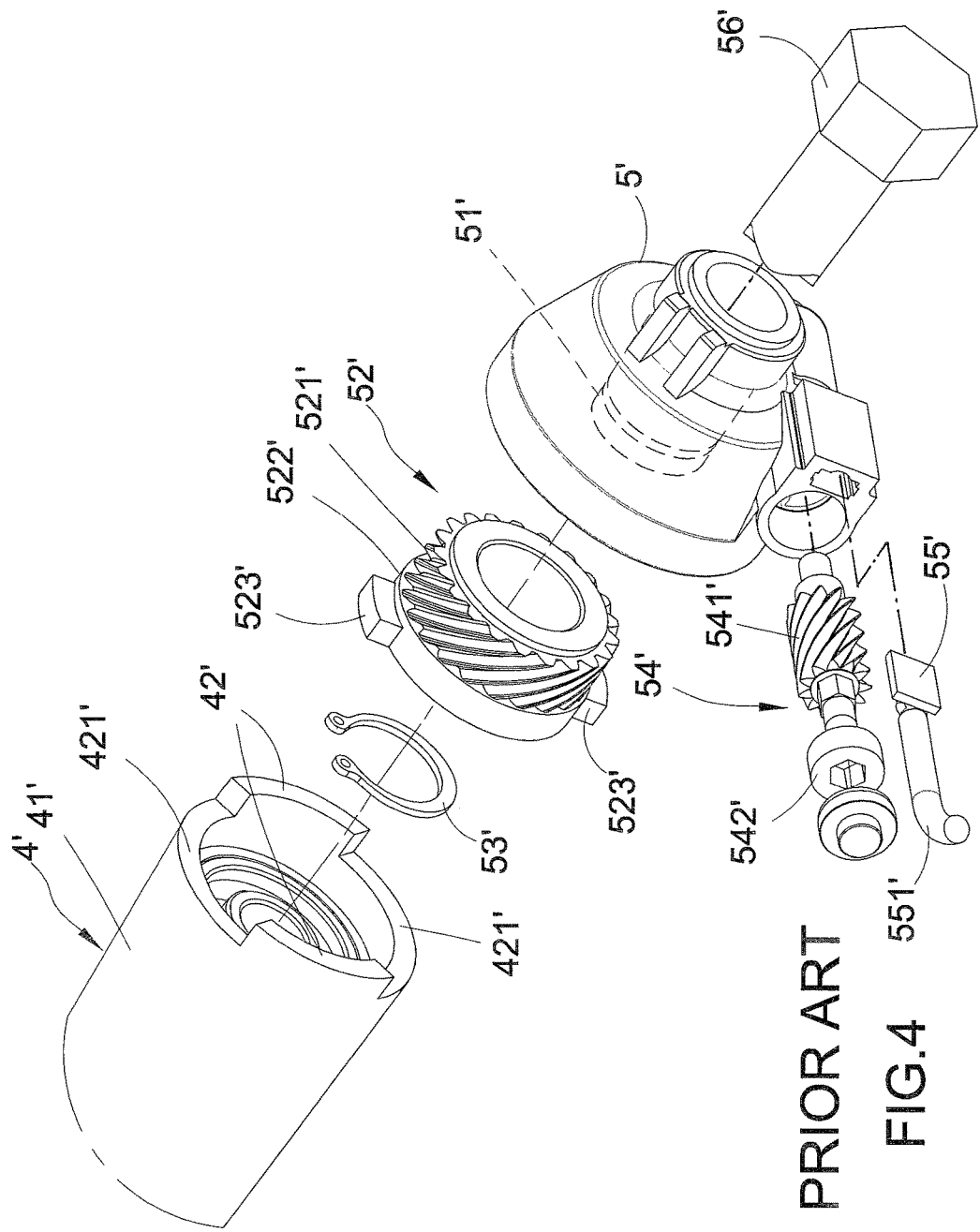
FIG. 4 is an exploded view of a wheel speed sensor driving mechanism according to the prior art.
Figure 5:
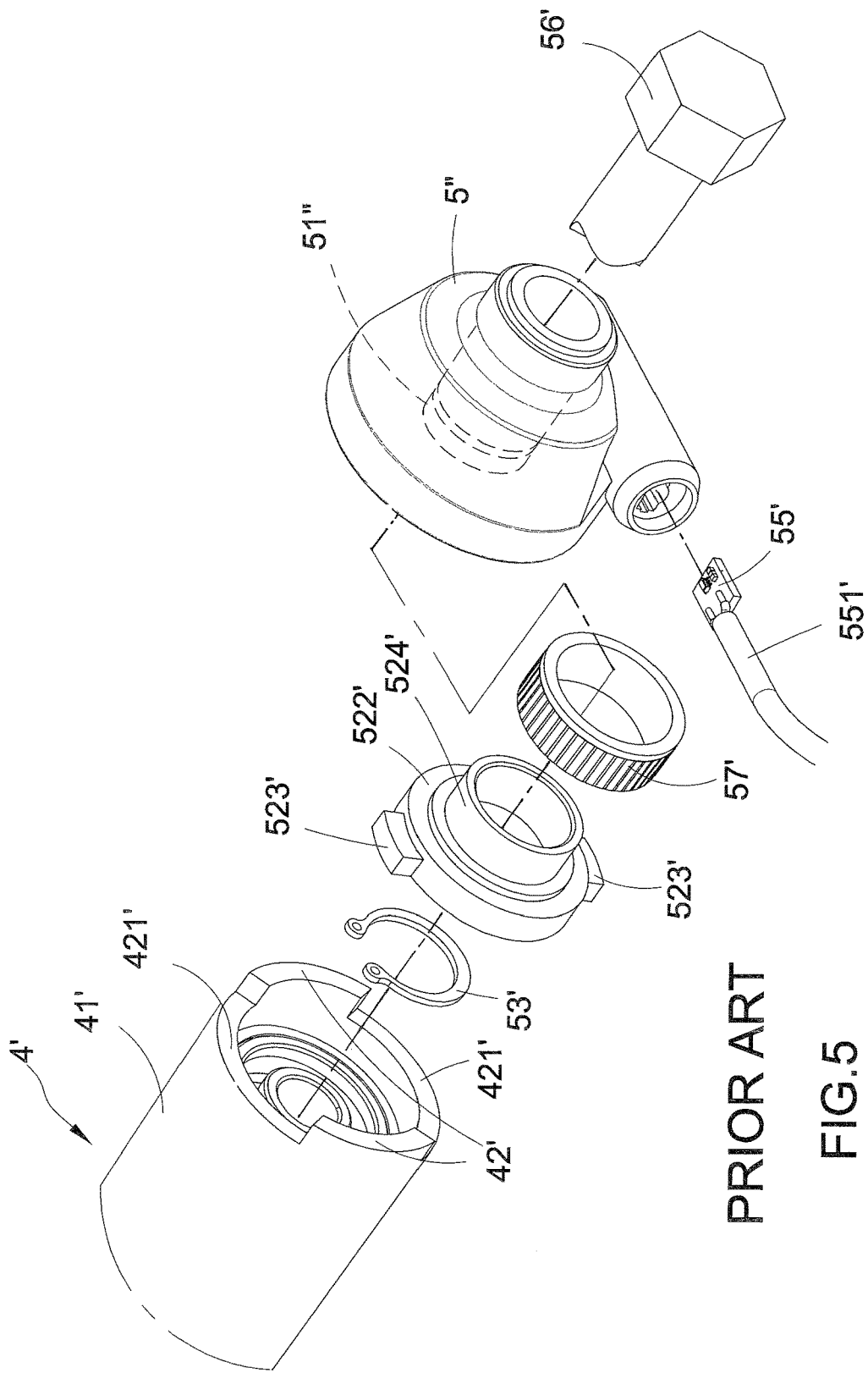
FIG. 5 is an exploded view of another design of wheel speed sensor driving mechanism according to the prior art.

Referring to FIG. 3, a wheel speed sensor driving mechanism in accordance with a third embodiment of the present invention is shown. This third embodiment is substantially similar to the aforesaid second embodiment with the exception that a magnetic domain element 211 of multiple magnetic domains is mounted around a tubular shaft 23 of the follower unit 2 to substitute for the worm wheel 21 and the wheel speed sensing unit 32. The follower unit 2 is mounted on a central axle tube 31' of a housing 3' and secured thereto by a C-shaped retainer 311. During operation, the sensing element 33 in the housing 3' detects changes in the magnetic domains around the magnetic domain element 211 and outputs the detected data through a signal line 34 to an electronic speedometer/tachometer or a computer of a ABS (anti-lock brake system) control unit for indicating the speed and distance.

In conclusion, the invention provides a wheel speed sensor driving mechanism for motorcycle, which facilitates mounting and dismounting, reduces friction between the center hole of the follower unit and the central axle tube of the meter gear housing, and assures accurate component positioning and synchronous concentric rotation of the follower unit with the axle tube of the motorcycle front wheel hub to enhance accurate signal detection.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A wheel speed sensor driving mechanism, comprising a motorcycle front wheel hub axle tube, a driving member, a follower unit, a housing having a central axle tube, and a sensing unit, wherein:

said motorcycle front wheel hub axle tube comprises two opposing protruding lugs axially forwardly extended from a distal end thereof, and two opposing recessed gaps defined between said two opposing protruding lugs at two opposite sides;

said driving member is mounted in the distal end of said motorcycle front wheel hub axle tube, comprising a chamfered edge at one end thereof, a plurality of driving blocks equiangularly spaced around an inner perimeter thereof, each said driving block having a chamfered edge at a distal end thereof, and two arched driving blocks extended around an outer perimeter thereof and respectively inserted into said two opposing recessed gaps of said motorcycle front wheel hub axle tube;

said follower unit is concentrically mounted on said central axle tube of said housing, comprising a tubular shaft, a plurality of ribs equiangularly arranged around the periphery of one end of said tubular shaft, a mounting groove defined between each two adjacent said ribs, and a magnetic domain element mounted around said tubular shaft at a front side relative to said ribs, each said rib having a chamfered edge at each of axial and radial ends thereof;

the number of said ribs of said follower unit is divisible by the number of said driving blocks of said driving member;

said sensing unit comprises a sensing element mounted in said housing and adapted for detecting changes in magnetic domains around said magnetic domain element upon rotation of said follower unit with said driving member and outputting the detected data through a signal line to a computer of an ABS (anti-lock brake system) control unit for indicating the speed and distance.

2. The wheel speed sensor driving mechanism as claimed in claim 1, wherein the said chamfered edge of said driving member and the said chamfered edges of said driving blocks are configured to mate with the said chamfered edges of said ribs of said follower unit for guiding said driving blocks of said driving member into the respective said mounting grooves of said follower unit.

3. The wheel speed sensor driving mechanism as claimed in claim 1, wherein said follower unit is fastened to said central axle tube of said meter gear housing with a C-shaped retainer.

4. The wheel speed sensor driving mechanism as claimed in claim 1, wherein said motorcycle front wheel hub axle tube further comprises an annular locating groove defined in an inner perimeter thereof; said driving member further comprises a retaining flange extended around the outer perimeter at one side relative to said arched driving blocks and engaged into said annular locating groove of said motorcycle front wheel hub axle tube.

* * * * *